UNITED STATES PATENT OFFICE.

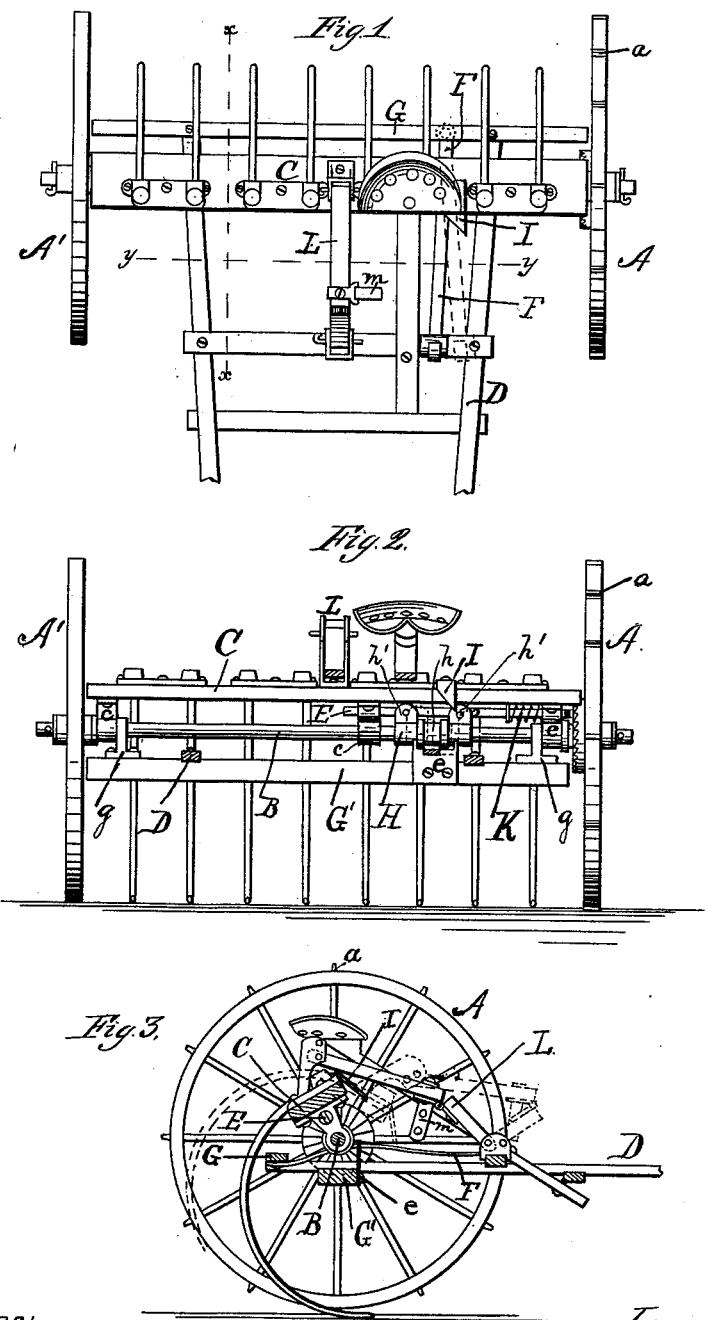

JAMES HOLLINGSWORTH, OF CHICAGO, ILLINOIS.

HORSE-RAKE.

SPECIFICATION forming part of Letters Patent No. 231,170, dated August 17, 1880.

Application filed April 5, 1880. (No model.)

*To all whom it may concern:*

Be it known that I, JAMES HOLLINGSWORTH, of Chicago, county of Cook, and State of Illinois, have invented certain new and useful Improvements in Horse-Rakes; and I do hereby declare that the following is a full, clear, and exact description thereof, reference being had to the accompanying drawings, forming a part of this specification.

This invention relates to the construction of that class of horse hay-rakes wherein the rake is oscillated by power from the wheel upon a continuous axle, and the object thereof has been to simplify, lighten, and cheapen the machine.

The nature of the invention will fully appear from the description and drawings.

In the drawings, Figure 1 is a plan of my improved rake; Fig. 2, a section upon the line $y\,y$ of Fig. 1, and Fig. 3 a section upon the line $x\,x$ of Fig. 1.

In the drawings, A A' represent the wheels, and B the axle, which is a continuous one; C, the rake-head, and D the thills. The rake-head is supported upon the axle by metal supports or hinging devices $c\,c$, three or more in number, the construction whereof will be fully understood from the drawings without words of description. They are slipped upon the axle and bolted to the rake-head at the proper places. Two of these supports are pierced, midway between the axle and rake-head, with openings through which is passed a sliding pawl, E. The latter is thrown out, so as to engage the ratchet-faced hub of the wheel A, by a vibrating foot-lever, F, pivoted to the rear cross-bar, G, of the frame, and connected to the pawl by a sleeve, H, loosely sliding upon the axle, having a depression, $h$, with the sides of which the lever engages, and upward arms $h'\,h'$, keyed or otherwise connected to the pawl. The pawl is released from the ratchet by the diagonal piece I, secured to the rake-head in such position that it will press against and shift the lever at each discharge. The spring K upon the pawl presses the latter away from the wheel, assisting in retracting the pawl and preventing accidental engagement with the wheel.

The frame-work G, G', and D is all supported from the axle by hangers $g$, bolted to the beam G'. The latter also bears a double stop, $e$, designed to limit the movement in both directions of the lever E.

The rake-head, in its normal position, is almost directly over the axle. This enables me to utilize the usual form of supports $c\,c$ as bearings for the sliding pawl, and by thus utilizing such supports I save the necessity of providing separate bearing parts for the pawl.

The periphery of the wheel A, which operates the rake, I provide with ribs or projections $a$, equispaced, and in such number that some one of them will at all times be resting upon or touching the ground. These projections prevent the slipping of the wheel under the contrary power of the dumping operation, and permit me to lighten the machine very much without endangering the rotation of the wheel, which has heretofore been imperfectly secured by the weight thrown upon it.

L is the ordinary elbow-lever for holding the teeth down, provided with the adjustable foot-piece $m$.

The machine constructed according to my invention is very much lighter than the rakes heretofore used, is greatly simplified from the old forms, the number of parts is reduced, and its efficiency is increased.

It will be seen that the sliding pawl, being located, as it is, between the rake-head and axle, is protected from clogging by loose hay, and to some extent from danger of breakage; also, that, by reason of the utilizing of the supporting-blocks $c\,c$ as bearings for the pawl, the head is relieved of the presence of special devices for that purpose, and its entire surface may be covered with the tooth-holders; also, that the pawl is thereby located directly opposite the wheel-hub, so that a straight pawl may be used, and that the end block, $c$, affords the pawl a very rigid and firm support directly at its point of contact with the ratchet; and, further, this rake may be transported with less danger of breakage than any other rake now made.

In the use of my invention the axle may be either stationary, oscillating, or revolving, as will be obvious to those skilled in the art.

I claim—

1. The combination, in a horse hay-rake, of the axle, the oscillating rake-head supported upon the axle by hinging-supports *c c*, the sliding pawl working in openings in said supports and oscillating with the head, the ratchet-faced wheel, and devices for throwing the pawl into and out of engagement with the wheel, substantially as specified.

2. The combination, in a horse hay-rake, of the axle, the oscillating rake-head, the sliding pawl, and the ratchet-faced wheel, said pawl being located between the axle and head, substantially as and for the purpose specified.

3. The combination and arrangement of the continuous axle, the oscillating tooth-bar, the pierced hinged bearings, the sliding pawl working in the said bearings, the sleeve sliding upon the axle and moving the pawl upon the axle, the vibrating foot-lever, and the shifting device on the tooth-bar, substantially as specified.

JAMES HOLLINGSWORTH.

Witnesses:
H. M. MUNDAY,
EDW. S. EVARTS.